Dec. 2, 1958  L. CAPOZZI ET AL  2,862,616
METHOD OF PACKAGING EPOXY RESINS
Filed March 17, 1958
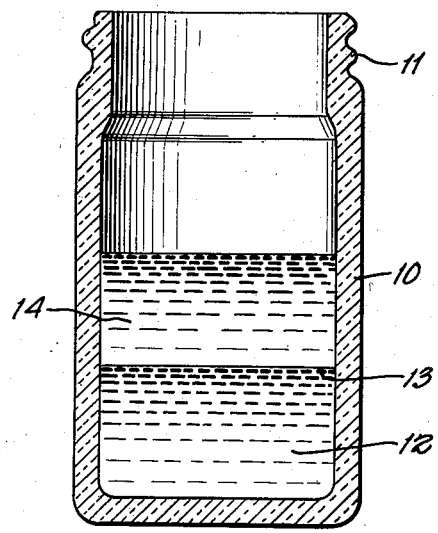
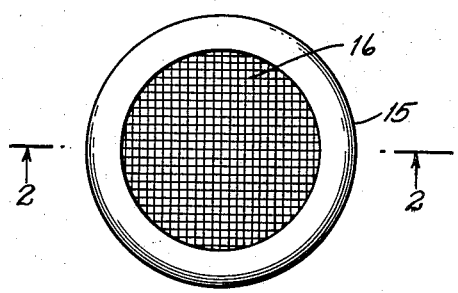
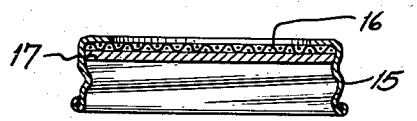
INVENTORS
LAWRENCE CAPOZZI
PHILIP KENNER
BY
*Kenyon & Kenyon*
ATTORNEYS

2,862,616

METHOD OF PACKAGING EPOXY RESINS

Lawrence Capozzi, East Paterson, N. J., and Philip Kenner, New York, N. Y., assignors to Lancaster Chemical Corporation, Carlstadt, N. J., a corporation of New York Application March 17, 1958, Serial No. 721,757

8 Claims. (Cl. 206—147)

This invention relates to epoxy resins and has particular reference to a novel package for the epoxy resin and a curing agent intended for use therefor, and to a method of packaging such substances.

Epoxy resins or complex epoxides are well known in the art. They may be produced by the reaction of polyhydric phenols with polyfunctional halohydrins such as epichlorhydrin and glyceroldichlorhydrin. Such epoxy resins or epoxides are capable of producing infusible and insoluble reaction products, particularly when admixed with accelerators or curing agents, which are also known in the art. These reaction products have a variety of uses including the encapsulating of electric connections and the like. When a complex epoxide is admixed with an appropriate curing agent a reaction takes place which is highly exothermic and results in the production of the infusible and insoluble reaction products referred to.

In many utilizations, including the protection of electrical connections and the like, the reaction between the epoxide and the curing agent is preferably carried out in situ; i. e. the operator who has spliced the electrical connection surrounds it with a properly proportioned mixture of the epoxy resin and curing agent in a mold and allows the reaction to take place until the infusible and insoluble reaction product is formed which surrounds and protects the electrical connection from the elements and, in the case of underground connections, from being grounded.

One difficulty in connection with the use of the epoxide-curing agent mixtures for the above purpose is that the operator is required to weigh out or otherwise measure appropriate quantities of the ingredients, frequently in outdoor locations where the use of weighing or measuring devices is difficult, and then mix them. As a result of cramped surroundings, unfavorable weather, and the like, a lack of uniformity frequently occurs and the infusible and insoluble reaction products may lack the necessary dielectric strength, clarity, or other properties desired.

One object of this invention is to provide the epoxy resin and curing agent in pre-measured amounts so that the operator need not weigh or measure them before using them, and may mix them in the container in which they are packaged.

Another object of this invention is to provide in a single package properly proportioned amounts of epoxide and curing agent.

Other objects of this invention will follow from the following description and drawings.

In the drawings:

Figure 1 is a diagrammatic vertical sectional view of a container or package embodying the present invention;

Figure 2 is a vertical sectional view taken along the plane of 2—2 of Fig. 3 of one type of closure for one end of the container; and Figure 3 is a plan view of the closure shown in Figure 2.

The numeral 10 designates a container, which may be of metal or glass. Plastics such as polyethylene and the like can also be used for the container, and any conventional material which does not react with the epoxy resin or the curing agent or which is lined with a non-reactive material may be used. The upper end of the container may be provided with threads 11, thereby adapting the container for sealing with a conventional screw cap closure.

In carrying out our invention we first charge into the container a pre-determined amount of an epoxy resin 12. The filling equipment used is any of the conventional types known in the art for handling materials having the viscosity of the resins used and the material is preferably flowed into the container in such manner as to avoid wetting the walls of the container above the level to which the epoxy resin is added. The size of the container and the amount of epoxy resin are so adjusted that, when charged with the amount of epoxy resin there will be room left in the container for the curing agent and that the combined epoxy resin and curing agent will be in an amount sufficient to encapsulate one electrical connection or serve any other specific purpose; in other words that the combination will make one dose of the epoxy-curing agent combination.

There is then flowed into the vessel a layer of a liquid curing agent 14. During this operation, which can also be performed with conventional equipment known in the packaging art, care should be taken to avoid mixing of the epoxy resin and the curing agent. This can be minimized by flowing the curing agent down along the wall of the container or by introducing it through a filling line which terminates almost at the level of the epoxy resin. However, we have found that excessive care need not be taken in practice because differences in viscosity and/or specific gravity between the resin and the curing agent tend to produce the desired result, namely, a substantially unmixed two layer system with the epoxy resin as the lower layer and the curing agent as the upper layer, the layers being in contact at the interface 13. The ratio of curing agent to epoxy resin in a given package depends on the nature of the curing agent and the epoxy resin and also on the properties desired for the finished product. We find that combinations ranging from 10 parts of curing agent (by weight) per 100 parts of epoxy resin up to 200 parts of curing agent or more per 100 parts of epoxy resin can be conveniently packaged by our invention.

After the predetermined amounts of epoxy resin and liquid curing agent are charged into the container, the top is sealed either by a screw cap closure such as shown in Figures 2 and 3 or by any other means known in the art.

For best results resins and curing agents should each be charged at 70–90° F. Where there has been some inadvertent or unavoidable intermingling of the two layers during filling the package should be maintained at the filling temperature for an hour or two during which period the lighter curing agent will substantially disengage itself from the underlying epoxy resin layer. Thereafter we store the containers while maintaining them in a substantially quiescent condition for 24–48 hours in a warm room, preferably at 90–120° F. Storage can be at ambient temperature, the difference being that the film forms more quickly at the more elevated temperatures which are specified above.

During the storage period the epoxy resin and the curing agent react with each other because they are in contact and form an insoluble, tough film at the interface 13 between the two layers. Moreover we have found that this film adheres tenaciously to the walls of the container thereby providing in effect an inner seal which separates the epoxy resin from the curing agent and prevents further reaction between the two, even if the container is thereafter subjected to shaking, change of position, or other mechanical disturbance and regardless of storage temperature.

The film produced by the reaction at the interface is so tough and tenacious that a very thin film will serve the purpose of keeping the bulk of the reactants from contact with each other. However, we prefer to store the materials in the warm room until a film thickness ranging from about 0.5 to about 1.5 percent of the diameter of the container has been formed.

Thus, when packaging epoxy resin in a 4 oz. container having an internal diameter of 1⅝ inches we have found that we have obtained good results with a film thickness ranging from about 8 to about 24 mils and preferably about 16 mils. Similarly, when using an 8 oz. container having a diameter of 1¾ inches we have obtained good results with film thicknesses ranging from about 9 to about 30 mils.

The following are examples of some embodiments of our invention.

*Example 1*

Into a four-ounce jar, having an inside diameter of 1.625" was poured 35 grams of Epon 820 liquid epoxy resin (bis-phenol A, epichlorohydrin condensate made by Shell Chemical—viscosity 40–100 poises at 77° F., epoxide equivalent 175–210, weight per gallon 9.7). On top of this was poured 35 grams of Lancast-A (a liquid curing agent derived from a fatty acid and a polyamine—viscosity 6–10 poises at 80° F., weight per gallon 7.95–8.00) in such a way that it formed a layer above the resin. The container was sealed and stored at 70° F. for 48 hours. A film formed at the interface which effectively prevented further contact between the two layers. The film was later found to be approximately 15 mils thick.

*Example 2*

Into a one-pint friction top paint can of 3.25" inside diameter was poured 200 grams of Ciba's Araldite 6010 (epichlorohydrin-bis phenol-A condensate viscosity 20,000 cps. at 73° F., epoxide equivalent of 196 and weight per gallon 9.8). On top of this was poured 200 grams of Lancast-A (a liquid curing agent derived from a fatty acid and a polyamine—viscosity 6–10 poises at 80° F., weight per gallon 7.95–8.00). The can was sealed and stored for 24 hours at 90° F. The film formed had a thickness of about 35 mils. It effectively prevented further contact between the two layers.

*Example 3*

Into an 8 ounce bottle, having an inside diameter of 1.875" was poured 100 grams of Bakelite's ERL-2774 (liquid epoxy resin made from bis-phenol-A and epichlorohydrin viscosity 10.5–19.5 poises, epoxide equivalent of 185–200, weight per gallon 9.6–9.8). On top of this was poured 67 grams of Versamid 125 (liquid polyamid resin made from a dimerized fatty acid and a polyamine; viscosity 80–120 poises at 40° C. weight per gallon 8.3). The liquids formed two layers. The container was sealed and stored at 80° F. for 36 hours. A film about 20 mils thick formed at the interface between the liquids. The film effectively prevented further contact between the two layers.

When the packaged resin is to be used, it is only necessary to open the container, break the interfacial film, which may be done with a stirring rod, spatula, or any similar and convenient implement, stir the two components together until they are well mixed and then pour them into the mold or other device in which the hardened infusible insoluble resin is desired.

For certain applications where it is required to have an entirely clear monolithic cured resin it is advisable to separate the film before pouring the resin-curing agent mixture.

One way of doing this is to use a closure of the type shown in Figures 2 and 3 wherein 15 designates a screw cap adapted for threaded engagement with the threaded portion 11 of the container 10. The upper end of the cap 15 is perforated and provided with a metal screen 16 or other means for straining solid particles from liquid. A removable sealing disc 17 is fitted below screen 16 so that when the screw cap is applied to the container disc 17 engages with the screw thread and the side walls of the container to provide a liquid tight and air tight closure. When it is desired to use the packaged materials, the screw cap is taken off the container and the sealing disc removed. Then when the film is broken and the contents of the container mixed together, the screw cap from which the sealing disc has been removed may be replaced and screen or filter 16 provides a means for preventing particles of the film 13 from flowing with the mixed reactants into the mold.

As is well known the reaction between the epoxy resins and curing agents preferably used with them is highly exothermic so that when the reaction in the mold begins it generates a considerable amount of heat. Even an unskilled operator can recognize the end point of the reaction by the cessation of the exothermic reaction. Similarly an unskilled operator need only be supplied with packages of different sizes each adapted for individual use and be instructed as to which size he should use for a given purpose. Thus by our novel packaging method the weighing out of the ingredients is done away with and the epoxy resin and curing agent can be provided in readily available form and in predetermined and properly proportioned amounts.

There are various epoxy resins on the market ranging in density from about 9 lbs. per gallon to about 10 and in viscosity from about 5 poises at 25° C. to about 200. The weights per gallon and viscosities of the curing agents also vary considerably. However, any of them can be used in the packages of our invention.

As curing agents there can be used aliphatic and aromatic primary amines, aliphatic polyamines containing both primary and secondary amine groups, amines which contain a primary as well as a tertiary amine group, tertiary amines, adducts of amines with resins or glycidyl ethers, alkylene oxide-amine adducts, amine cyanoethylation products, amino amides derived from fatty acids and polyamines, polyamide resins, mercaptan terminated polysulfide polymers in combination with amines and various modifications of the above as well as admixtures thereof. Other liquid curing agents known in the art can also be used. In general, the curing agents are less dense than the epoxy resin and will be the upper of the two layer system. However, when the epoxy resin is the lighter of the two, the filling procedure is reversed—i. e. the curing agent is charged into the container first, followed by the resin.

Our invention can also be used when the two layers are of almost identical density, since the epoxides and curing agents are relatively immiscible and will be kept apart by reason of differences in viscosity for periods long enough for formation of the interfacial film provided sufficient care is taken to avoid mixing while adding the supernatant layer.

As is known in the art, the epoxy resins are frequently sold and used combined with fillers, pigments and/or reactive and non-reactive diluents. Similarly it is known in the art to use curing agents or mixtures of curing agents to which have been added fillers and/or pigments. Any of these materials can be used in our novel package, and in the description above and the claims that follow it is to be understood that the terms epoxy resin and curing agent respectively include these materials with or without filling agents, pigments, diluents and other adjuvants known in the art, the essential feature of our invention being that the epoxy resin component and the curing agent component, each with or without adjuvants, are packaged in a two layer system which is maintained in a relatively quiescent condition at a reaction temperature until a film is formed by the reaction between the curing agent and the epoxy agent, the said film thereafter acting as a seal between the two components until it is deliberately broken by mechanical means.

We claim:

1. A method of packaging an epoxy resin and a curing agent therefor comprising partly filling a container with a liquid epoxy resin, adding to the partly filled container as a substantially separate layer above and in interfacial contact with the said resin a liquid curing agent therefor, and maintaining the container in a relatively quiescent condition so as to avoid intermixing of the two layers for a sufficient period of time to cause the formation of an impermeable film of cured resin by the interaction of the resin and the curing agent at the interface between the two layers.

2. A package including a container, a layer of liquid epoxy resin and a layer of curing agent for said resin therein, the said layers being separated from each other by an impermeable film produced by the interaction in situ of said resin and said curing agent.

3. A package as in claim 2 wherein the thickness of the impermeable film is from about 0.5 percent to about 1.5 percent the diameter of the container.

4. A method of packaging an epoxy resin and a curing agent therefor comprising partly filling a container with a liquid epoxy resin, adding to the partly filled container as a substantially separate layer above and in interfacial contact with the said resin a liquid curing agent therefor, said curing agent being of lower density than said resin, and maintaining the container in a relatively quiescent condition so as to avoid intermixing of the two layers for a sufficient period of time to cause the formation of an impermeable film of cured resin by the interaction of the resin and the curing agent at the interface between the two layers.

5. A method of packaging an epoxy resin and a curing agent therefor comprising partly filling a container with a liquid epoxy resin, adding to the partly filled container as a substantially separate layer above and in interfacial contact with the said resin a liquid curing agent therefor, said curing agent having a viscosity differing from the viscosity of said resin, and maintaining the container in a relatively quiescent condition so as to avoid intermixing of the two layers for a sufficient period of time to cause the formation of an impermeable film of cured resin by the interaction of the resin and the curing agent at the interface between the two layers.

6. A method of packaging an epoxy resin and a curing agent therefor comprising charging into a container, as separate layers therein with interfacial contact, said resin and said curing agent, and maintaining the container in a relatively quiescent condition so as to avoid intermixing of the two layers for a sufficient period of time to cause the formation of an impermeable film of cured resin by the interaction of the resin and the curing agent at the interface between the two layers.

7. A method of packaging an epoxy resin comprising charging into a container a liquid epoxy resin produced by the condensation of bis-phenol-A and epichlorohydrin, then adding to the container as a substantially separate layer above and in interfacial contact with said resin a liquid curing agent derived from a fatty acid and a polyamine, and maintaining the container in a relatively quiescent condition so as to avoid intermixing of the two layers for a sufficient period of time to cause the formation of an impermeable film of cured resin by the interaction of the resin and the curing agent at the interface between the two layers.

8. A package including a container, removable closure means associated with said container, a layer of liquid epoxy resin and a layer of curing agent for said resin within said container, the said layers being separated from each other by an impermeable film produced by the interaction in situ of said resin and said curing agent, said closure means having a screen and a removable sealing member therein.

References Cited in the file of this patent

UNITED STATES PATENTS

| | | |
|---|---|---|
| 477,217 | McCoy | June 21, 1892 |
| 855,984 | Russell | June 4, 1907 |
| 1,846,052 | Grant | Feb. 23, 1932 |
| 2,700,461 | Smith | Jan. 25, 1955 |